(12) United States Patent
Pisoni et al.

(10) Patent No.: US 7,623,578 B2
(45) Date of Patent: Nov. 24, 2009

(54) TIME DOMAIN EQUALIZATION USING FREQUENCY DOMAIN OPERATIONS

(75) Inventors: Fabio Pisoni, Busto Garolfo (IT); Roland Hug, Piétrain (BE); Marco Bonaventura, Venice (IT)

(73) Assignees: STMicroelectronics N.V., Amsterdam (NL); STMicroelectronics Belgium N.V., Zaventem (BE)

( * ) Notice: Subject to any disclaimer, the term of this patent is extended or adjusted under 35 U.S.C. 154(b) by 140 days.

(21) Appl. No.: 10/514,690

(22) PCT Filed: May 19, 2003

(86) PCT No.: PCT/BE03/00087

§ 371 (c)(1),
(2), (4) Date: Nov. 17, 2004

(87) PCT Pub. No.: WO03/098832

PCT Pub. Date: Nov. 27, 2003

(65) Prior Publication Data

US 2005/0175112 A1    Aug. 11, 2005

(30) Foreign Application Priority Data

May 17, 2002  (EP)  .................................. 02291217
Dec. 24, 2002  (EP)  .................................. 02447271

(51) Int. Cl.
*H04K 1/10*  (2006.01)
(52) U.S. Cl. ........................ 375/260; 375/232; 375/350
(58) Field of Classification Search ................ 375/260, 375/350
See application file for complete search history.

(56) References Cited

U.S. PATENT DOCUMENTS

| 5,317,596 | A | 5/1994 | Ho et al. |
| 6,023,719 | A | 2/2000 | Barak et al. |
| 2001/0021219 | A1 | 9/2001 | Sasaki et al. |

FOREIGN PATENT DOCUMENTS

| DE | 42 33 222 A1 | 4/1994 |
| EP | 0 991 202 A1 | 4/2000 |
| WO | WO 01/63870 A1 | 8/2001 |
| WO | WO 01/93448 A2 | 12/2001 |
| WO | WO 01/93448 A3 | 12/2001 |

OTHER PUBLICATIONS

International Search Report from corresponding International Application No. PCT/BE03/00087, filed May 19, 2003.

(Continued)

*Primary Examiner*—Mohammad H Ghayour
*Assistant Examiner*—Leon Flores
(74) *Attorney, Agent, or Firm*—Lisa K. Jorgenson; James H. Morris; Wolf, Greenfield & Sacks, P.C.

(57) ABSTRACT

An equalizer for a multi carrier transmission system, converts a transmitted multi carrier signal into sampled frequency domain signals, and suppresses time domain delay dispersion, on the sampled frequency domain signals. It exploits circulant decomposition of a Toeplitz matrix to enable the computationally heavy evaluation of a matrix multiplied by a vector, to be avoided. Increased precision arises from the frequency domain processing being equivalent to a longer time domain FIR filter than is normally practical. The amount of compensation for different carriers can be adjusted, which can lead to increased precision.

16 Claims, 4 Drawing Sheets

OTHER PUBLICATIONS

International Search Report from related International Application No. PCT/BE03/00088, filed May 19, 2003.

Van Acker, K et al., *Frequency Domain Equalization with Tone Grouping in DMT/ADSL-Receivers*, Signals, Systems, and Computers, 1999, Conference Record of the Thirty-Third Asilomar Conference n Oct. 24-27, 1999, Piscataway, NJ. pp. 1067-1070, XP010373800.

Van Acker, K et al., *Per Tone Equalization for DMT-Based Systems*, IEEE Transactions on Communications, vol. 49, No. 1, Jan. 2001, pp. 109-119, XP001038829.

TIME DOMAIN EQUALIZATION USING FREQUENCY DOMAIN OPERATIONS

RELATED APPLICATIONS

This invention is related to earlier filed European patent application EP 02291217 filed on 17 May, 2002, entitled "Apparatus and Method of Echo-Cancellation" hereby incorporated by reference in its entirety.

FIELD OF THE INVENTION

This invention relates to circuits and methods for modeling a dispersive channel in a telecommunications system as well as to equalizers, to receivers and transmitters having such equalizers, to modems having such receivers and/or transmitters, to central office equipment having such modems, to signal processors, to corresponding software and methods, and to methods of offering a communication service over networks having such receivers and/or transmitters, especially for multi-carrier telecommunications systems in which a signal is transmitted and received over a dispersive channel.

BACKGROUND TO THE INVENTION

Asymmetric high speed Digital Subscriber Line (ADSL) and Very high speed Digital Subscriber Line (VDSL) are examples of modem communication systems which permit transmission of data over band-limited communication lines at very high rates, e.g., up to 52 Mbits/s. They are examples of multi-carrier systems. Reference is made to "ADSL, VDSL and Multicarrier Modulation", J. A. C. Bingham, Wiley, 2000. Multi-carrier modulation is a well known means of transmitting digital data by splitting that data into fixed-length data "blocks" o "symbols" each having the same number of sub-blocks or bits. Analog transmission of these blocks is carried out using a set of carrier signals. There is a carrier for each of the sub-blocks in one block. The carriers have frequencies which are equally spaced across the transmission band of the transceiver. One such arrangement is called DMT (Discrete multi-tone). DMT modems transmit data by dividing it into several interleaved bit streams, and using these bit streams to modulate several carriers. Another application of multicarrier modulation is in OFDM systems, as described for instance in "ODFM for Wireless Multimedia Communications", R. van Nee and R. Prasad, Artech House, 2000. Applications are for example, wireless LAN's. This modulation technique also finds application in Satellite communications, see for example, "Satellite Communications Systems", G. Maral, M. Bousquet, Wiley, 1998.

A significant limitation in a multiple carrier system is intersymbol interference (ISI) and/or intercarrier interference (ICI). ISI is essentially caused by delays in the transmission path which can vary with frequency. Since a typical signal pulse can be regarded as having components at many frequencies, the effect of a dispersive channel is to spread or "disperse" the pulse in the time domain, and cause overlap with neighboring pulses. The average duration of the delays and the variation or range of the delays, varying with time and frequency for example, cause wave "dispersion" and overlap into neighboring pixels and hence ISI. Small amounts of ISI can cause a disproportional amount of distortion in the output of the demodulator used to recover the original data signals. The original data symbols can be recovered accurately provided the transfer function of the dispersive channel can be found/simulated.

One way to compensate for ISI in a DMT system is to add a cyclic prefix (CP) (guard time) to the beginning of each transmitted DMT symbol. This CP absorbs the overlap caused by dispersion and can be discarded. Unfortunately, while increasing the length of prefixes reduces ISI, it also decreases the effective data rate. Another approach, which can be used in conjunction with the CP technique or not, is to employ an equalizer at the receiver. However many equalizers require considerable and ongoing computation "overhead."

Equalization involves correcting or compensating for the effect of the dispersive channel on the received signal. Generally, the frequency response of the channel is not known accurately, nor is the time domain response. Accordingly, an equalizer is designed using numerous parameters that must be adjusted on the basis of measurements of a channel's signal-affecting characteristics. It is known to have nested equalizers for equalizing separately in the time domain and the frequency domain. One known technique is a time domain equalizer (TDEQ) employed to shorten the effective delay from the dispersive channel. It is generally a linear digital filter arranged to shrink the total impulse response of the channel to the length of CP+1 symbol, such that the overlap from one symbol lands in the CP but does not interfere with the next symbol. In a DMT receiver, following TEQ, the CP is removed, followed by a Fast Fourier Transform (FFT), complementary to the IFFT of the transmitter. The signal can be then passed to a frequency domain equalizer (FDEQ), to recover the transmitted symbols, e.g. QAM symbols from which the bit streams are recovered.

A transversal filter is a common choice for a linear equalizer. The tap coefficients correspond to the channel parameters and represent a "model" of the dispersive nature of the channel. If the coefficients are properly selected, the equalizer can attenuate ISI significantly.

Equalization can involve a training sequence that is compared at the receiver with a locally-generated or otherwise known training sequence (cross-correlation). Adaptive equalization involves adapting the coefficients continually and automatically directly from the received data. A drawback of adaptive equalization is the computational "cost" involved in continually updating the filter coefficients so that the channel model is adapted to the current conditions of the channel.

U.S. Pat. No. 6,408,022 (Fertner) shows reducing both computational cost and cyclic prefix extension, but at the same time effectively equalizing received signals to compensate for ISI using a short length equalizer. Krakovian calculus is used to determine optimum time-domain equalizer coefficients using a selected offset and an established cost function. The implementation involves taking advantage of the Toeplitz structure of a krakovian structure.

U.S. Pat. No. 6,404,806 (to Ginesi, et al.) shows an example of an ADSL system having a TDEQ including an estimation of, and compensation for, echo on the line and the ingress of out of band noise, particularly RFI, into the in band channels. To reduce both the complexity of the TDEQ and duplexing filters, a method for training the TDEQ is used, which includes computing a Toeplitz autocorrelation matrix.

U.S. Pat. No. 6,353,629 (to Pal) shows time domain equalization techniques referred to as poly-path time domain equalization techniques; improved training methods for training transmitters and/or receivers of a data transmission system; and techniques for providing time domain equalization to a transmitter side of a data transmission system. The training methods involve Toeplitz matrices.

U.S. Pat. No. 6,233,276 (to Simeon) shows using a time domain filter or equaliser, with a reduced number of digital filter coefficients. The full-length equalizer channel impulse response is truncated by first selecting a subset of contiguous filter samples followed by windowing and convolution with a time domain representation of a frequency domain filter. The result is a shorter equalizer having fewer coefficients so as to improve data transmission rate.

U.S. patent application 20020106035 A1 (Harikumar, Gopal et al.) shows a spectrally constrained impulse shortening filter for time domain equalisation in a DMT receiver. A target spectral response is calculated and the impulse response of the channel shortened so that a significant part of an energy of the impulse response is confined to a region that is shorter than a target length.

SUMMARY OF THE INVENTION

It is an aim of the present invention to provide improved apparatus and methods for multicarrier telecommunications systems and elements thereof. According to a first aspect of the present invention, there is provided an equalizer for a multi carrier transmission system, for at least reducing delay dispersion in a signal, the equalizer having a convertor arranged to convert a multi carrier signal into sampled frequency domain signals, and a suppressor for suppressing time domain delay dispersion, on the sampled frequency domain signals, the convertor being arranged to use a sequence of consecutive samples of the multicarrier signal, the sequence having a length of at least two symbols, to derive oversampled frequency domain signals for reduction of dispersion of one symbol.

Compared to known adaptive filters operating on time domain signals, this is notable for enabling increased precision arising from the frequency domain processing being equivalent to a longer time domain FIR filter than is normally practical. Also by processing frequency domain signals, it becomes easier to adjust the amount of compensation for different carriers, which can lead to increased precision. In principle it also enables a reduction in an amount of processing, or such processing to scale better with precision, as it enables the computationally heavy evaluation of a matrix multiplied by a vector, as used in the conventional techniques, to be avoided. The suppression need not remove all the dispersion, if it is reduced sufficiently that remaining dispersion is substantially within a guard band. In principle the suppression can be equalization at a receiving side, or pre-emptive compensation of the transmitted signal at a transmitting side before it is transmitted. The former case is often easier to implement. Enabling an oversampled frequency domain representation allows the frequency domain signals to be processed more easily.

The suppressor may be adaptive according to feedback from a suppressed dispersion output signal at a receiving side.

This helps enable the suppression to adapt to changing transmission conditions and changing transmission signals.

The suppressor may have a parameter generator arranged to use the feedback to generate adaptively a set of frequency domain dispersion parameters to suppress the dispersion from one symbol.

This is notable for helping reduce the range of delays sufficiently that substantially all the block is brought within the guard band, so that subsequent FEQ is more effective.

The parameters may be configurable to adjust the suppression per carrier.

This is particularly useful where there are significant differences between the channels, such as at the edges of a band of channels, or where there is RFI affecting some frequencies, or where the transmission path has branches for different channels so the path lengths differ for example.

The parameters may comprise a vector having a value for each of the carriers.

The parameter generator may be arranged to derive the parameters using an impulse response of the transmission path.

The equalizer may be arranged to separate odd and even samples of the oversampled frequency domain signal, for separate processing.

This is notable for enabling simpler processing operations.

The suppressor may be arranged to carry out Fourier transform based operations separately on the odd and even frequency domain samples. The Fourier transform based operations may be equivalent to a time domain equalization.

The transform based operations can be derived from circulant decomposition of a Toeplitz matrix into a sum of a circulant and a skew circulant component of the matrix. This can reduce the computational overhead by replacing a matrix-vector multiplication by as few as four Fourier transforms.

The transform operations may be arranged to implement the equation:

$$2Y_i = \text{diag}(\Lambda_{even})W + F_N P^* F_N^* \text{diag}(\Lambda_{odd}) F_N P F_N^* W$$

where Y is the processed output,

W are frequency domain signal processing parameters which can be used for adaptation, i.e. of the frequency-domain representation of the TEQ.

F is the Fourier transform operator,

P is the constant diagonal operator $P \equiv \text{diag}(e^{-jm/N})$ (n=0 ... N−1) and $\text{diag}(\Lambda_{even})$ are even ones of frequency domain samples, and $\text{diag}(\Lambda_{odd})$ are odd ones of frequency domain samples.

Another aspect provides a corresponding method of equalizing for multi carrier transmissions, for at least reducing delay dispersion in a signal, comprising converting a multi carrier signal into sampled frequency domain signals, and suppressing time domain delay dispersion, on the sampled frequency domain signals, the converting being arranged to use a sequence of consecutive samples of the multicarrier signal, the sequence having a length of at least two symbols, to derive oversampled frequency domain signals for reduction of dispersion of one symbol.

Another aspect the present invention provides a receiver having a demodulator for recovering data from a multicarrier input signal, and the equalizer of any preceding claim for equalizing the input signal.

Another aspect of the present invention is a modem having a receiver as described above and a transmitter. The modems may be included in central office or customer premises' equipment each modem being for coupling a subscriber line to a telecommunications network.

Another aspect of the present invention provides a signal processor for carrying out a time domain matrix type operation on an input signal, and having a convertor arranged to convert the input signal into oversampled frequency domain samples, and a processor arranged to carry out frequency domain transform operations on the frequency domain samples, the convertor being arranged to use a sequence of consecutive samples of the multicarrier signal, the sequence having a length of at least two symbols and the transformed frequency domain samples being adapted for a frequency response of a dispersive signal transmission path.

The processor is adapted to carry out Fourier transform based operations separately on the odd and even frequency domain samples. The transform operations can be derived by circulant decomposition of a matrix into a circulant and a skew circulant component of the matrix.

The signal processor may be adapted to carry out the transform operations-based on the equation:

$$2Y_i = \text{diag}(\Lambda_{even})W + F_N P^* F_N^* \text{diag}(\Lambda_{odd}) F_N P F_N^* W$$

where Y is the processed output,

W are frequency domain signal processing parameters which can be used for adaptation to characteristics of the dispersive signal transmission path, e.g. of the frequency-domain representation of the TEQ.

F is the Fourier transform operator,

P is the constant diagonal operator $P \equiv \text{diag}(e^{-jm/N})$ (n=0 ... N−1), $\text{diag}(\Lambda_{even})$ are even ones of frequency domain samples, and $\text{diag}(\Lambda_{odd})$ are odd ones of frequency domain samples.

The signal processing parameters may comprise adaptively derived characteristics of a signal transmission path. The matrix type operation may be a compensation for distortion introduced by the transmission path. This can encompass equalization, echo cancellation such as is shown in the above referenced EP application, or any distortion which can be represented or approximated by a matrix which can be decomposed.

The present invention also comprises a dispersive channel modelling device for modeling a dispersive path in a multi-carrier telecommunications system. The device may have the signal processor described above.

Another aspect of the invention provides software for implementing the equalizer or for carrying out (which encompasses controlling) corresponding method steps. This acknowledges that such software can be a valuable, separately tradable commodity. An equalizer in the form of software is intended to encompass software functions, (and therefore the software essentially defines the functions of the equalizer, and can therefore be termed an equalizer, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a method of offering a communication service over a network using the receiver described above. As the advantages set out above can feed through to enable a better network, which is more reliable or more flexible, or greater capacity, or more cost effective for example, consequently a communication service over the network can show a corresponding improvement, and directly affect the value of such services. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
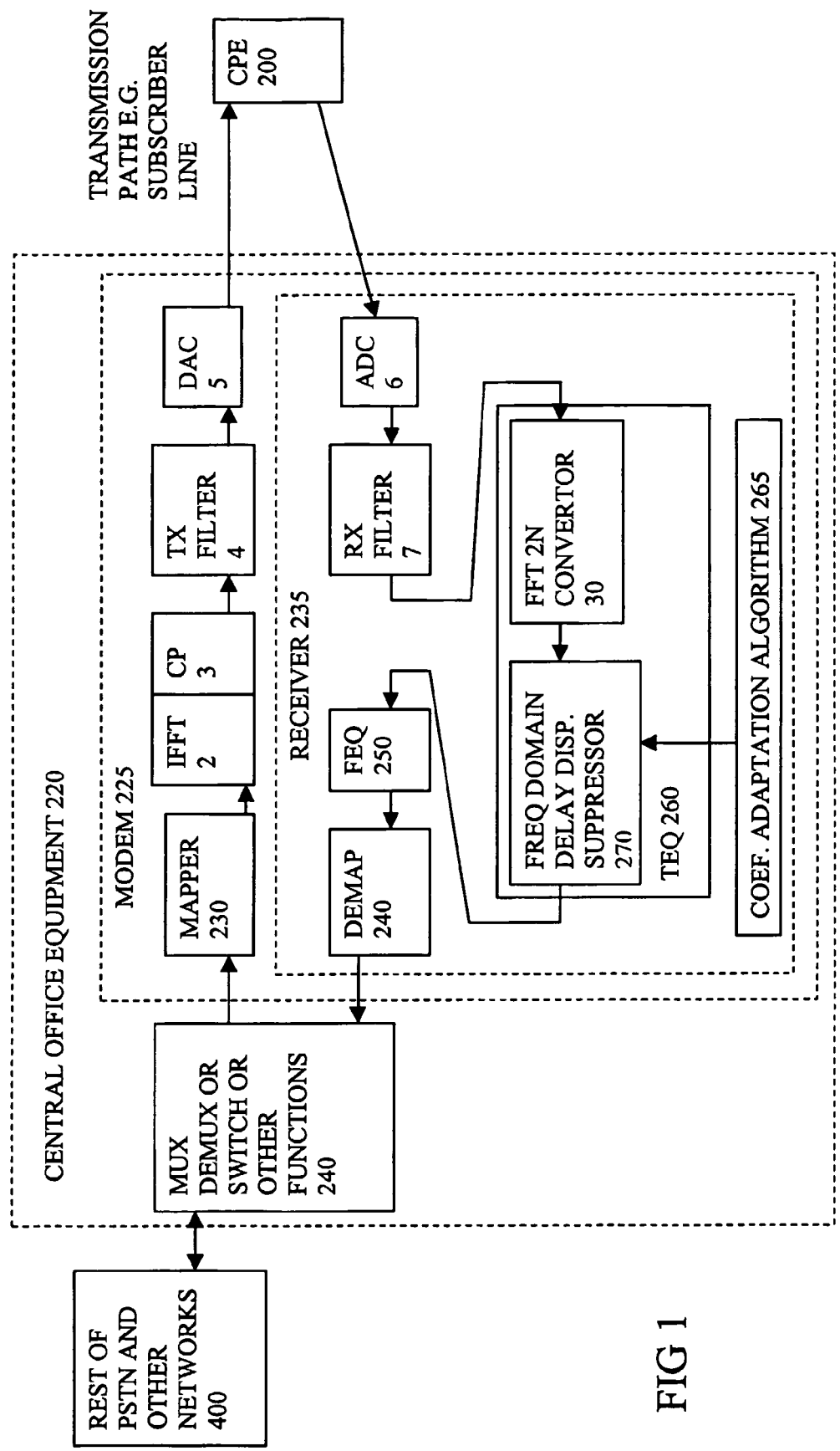
FIG. 1 shows an embodiment in the form of a modem having a transceiver

In the drawings, and in the following descriptions, like elements have been assigned like numerals for the sake of consistency.

The present invention will be described with reference to certain drawings and embodiments but these are provided by way of example only. The present invention may find wider application than these examples, e.g. as indicated in the attached claims. For example, the present invention may find application wherever a dispersive channel has to be modeled, e.g. in satellite, ADSL, VDSL, xDSL, wireless LAN applications. The physical nature of the channel is considered not limiting, e.g. air interface, cable, optical fibre, twisted pair, coax cable. Also where reference is made to Fourier transforms other transforms may be used. For example, discrete wavelet transforms and inverse transforms may be used as explained in the book by J. A. C. Bingham mentioned above. The relationship between Fourier, wavelet and other transforms is explained in the book "Wavelets and Subbands", A. Abbate et al., Birkhäuser, 2002.

In FIG. 1, there is illustrated a modem 225 having a discrete multi-tone (DMT) transceiver, which includes a receiver 235 employing an equalizer 260 according to respective embodiments of the present invention. The modem is coupled to a subscriber line for transmitting or receiving to or from consumer premises equipment CPE 200. Of course the embodiments are equally applicable at the CPE or in other types of multicarrier communications links such as cable connections, wireless links and so on. The modem is shown incorporated in central office equipment having other functions 240 such as mux or demux or switching, to couple many subscriber lines via modems to the rest of the PSTN or other networks 400.

The transceiver includes a transmitter portion having a mapper for receiving data to be modulated and transmitted, and a signal output for outputting transmit signals to a digital-to-analog converter (DAC) 5 for subsequent transmission. The transceiver also includes a receiver portion having a receive signal input for receiving signals transmitted from remote transceivers via an analog-to-digital converter (ADC) 6, and a receive data output for outputting dispersion suppressed received data to a demapper 240. A transmission path exists from the transmitter portion output to the CPE, and another exists in the reverse direction to the receiver portion input along the subscriber line. The path includes at least a hybrid transformer (not shown) of the transceiver and may include other elements of the transceiver located outside the transmitter portion and the receiver portion of the transceiver.

In the transmitter portion of the transceiver, an inverse fast Fourier transform unit (IFFT) 2 receives input data in the form of frequency-domain DMT data blocks comprised of N complex-valued data elements. The IFFT unit 2 modulates each of the N data elements with N carrier signals at evenly spaced frequency intervals thereby converting the N frequency-domain data elements into a block (or "symbol") of N real-valued time-domain samples.

A cyclic prefix block (CPB) 3 may be provided. For example the cyclic prefix block 3 may copy the last L samples of the N time-domain sample block to form a cyclic prefix therewith, and prepends the cyclic prefix to the beginning of the block. The cyclic prefix may also be placed at other positions in the data stream. This is done in order to reduce inter-block interference at the remote transceiver to which the block of (N+L) samples is subsequently transmitted. The output of the cyclic prefix block 3 is DMT transmit signals comprising a plurality of time-domain multi-carrier transmit blocks/symbols.

The DMT transmit signals are subsequently passed through a transmitter low-pass filter unit 4 and thence through a digital-to-analogue converter 5 prior to duplex transmission to a remote transceiver.

The receiver portion input is coupled to an analogue-to-digital converter (ADC) 6 arranged to digitise received DMT time-domain signals received from a remote transceiver, and to pass those signals, so digitised, through a receiver filter 7.

A frequency-domain processing, equivalent to time domain equalization' is subsequently applied by TEQ 260 to the signals output of the receive filter 7 to produce DMT time-domain dispersion suppressed received signals. The TEQ involves frequency domain operations. An FFT convertor 30 generates frequency domain samples using a block of 2N or more input samples to create an oversampled set of frequency samples. These are used by the frequency domain delay dispersion suppressor 270. The suppression is adaptive using coefficients generated by an adaptation algorithm 265. This can be based on feedback from dispersion suppressed outputs taken from a point downstream in the processing chain. The coefficients can be frequency domain coefficients.

Figure 2:
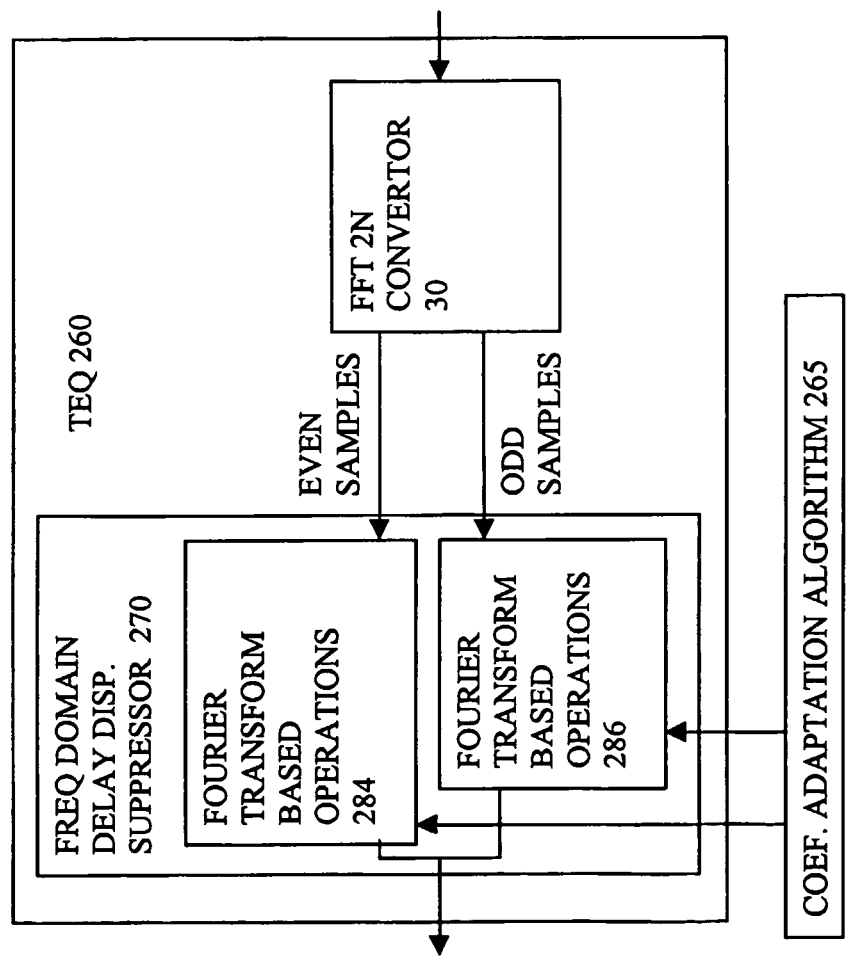
FIG. 2 shows an embodiment in the form of an equalizer, for use in the transceiver of FIG. 1 or other applications

The output of the TEQ is fed to a conventional frequency domain equalizer 250 which can serve to resize and rotate the ISI/ICI-free carriers, so that they can fit into the constellation grid of the demapper 240 to produce de-modulated data samples following conventional principles. The output of the receiver side of the modem is passed on to other parts of the central office equipment for onward routing and transmission. Other parts of the modem such as echo cancellation, clock offset processing and so on are not shown for the sake of clarity. Echo cancellation can be achieved using the techniques shown in the above referenced European patent application. The FIG. 2 shows an embodiment of an equalizer either for use in the modem of FIG. 1 or in other applications. It shows the convertor taking in time domain samples of the multicarrier transmitted signal, and producing frequency domain samples. These are effectively oversampled by carrying out the Fourier transform over a block at least 2N in length where N is the number of carriers. The convertor has two separate outputs representing odd frequency domain samples and even frequency domain samples respectively. Fourier transform type operations are carried out on these outputs, by parts 284 and 286 respectively. The operations also use frequency domain coefficients adapted by algorithm 265 to provide feedback. The delay dispersion suppressor 270 incorporates the transform operations and generates a combined output which is effectively a frequency-domain equalized output. As the skilled person will appreciate one aspect of the present invention is implementation or emulation of a TEQ in the 'oversampled' frequency-domain.

The derivation of appropriate equations governing implementations in the frequency-domain of the TEQ 260 will now be explained. As is commonly known, for h being the impulse response of the dispersive transmission path, the N-point vector y of received samples can be represented as:

$$y_i = T_{i,i-1} \cdot h \qquad \text{eq.}(1)$$

where $T_{i,i-1}$ is the state vector of the received signal, represented as an N×N Toeplitz matrix with symbol length N (i.e. the number of unique time-domain samples per DMT block/symbol excluding any cyclic prefix attached thereto) and cyclic prefix length L, and is derived from a pair of successive multi-carrier received blocks "$u_{i-1}$" and "$u_i$" each being N+L samples in length, such that:

$$\text{eq. (2)}$$

$$\underbrace{\phantom{CP \text{ of symbol } i}}_{CP \text{ of symbol } i} \quad \underbrace{\phantom{\text{symbol } i-1}}_{\text{symbol } i-1}$$

$$T = \begin{bmatrix} x_1^i & \vdots & x_N^i & x_{N-1}^i & \cdots & x_{N-L+1}^i & x_N^{i-1} & x_{N-1}^{i-1} & \cdots & x_{L+2}^{i-1} \\ x_2^i & \vdots & & & & & & & & \cdots \\ \cdots & \vdots & & & & & & & & x_{N-1}^{i-1} \\ & \vdots & & & & & & & & x_N^{i-1} \\ & \vdots & & & & \cdots & & & & x_{N-L+1}^i \\ & \vdots & & & & & & & & \cdots \\ \cdots & \vdots & & & & & & & & x_{N-1}^i \\ x_{N-1}^i & \vdots & & & & & & & & x_N^i \\ x_N^i & \vdots & x_{N-1}^i & & \cdots & & & & x_2^i & x_1^i \end{bmatrix}$$

Samples $\{\chi^{i-1}\}$ are taken from the cyclic prefix of the formerblock "$u_{i-1}$" and samples $\{\chi^i\}$ are taken from the latter "$u_i$". The Toeplitz matrix is not diagonalizable via a fast Fourier transform and solving this equation is computationally intensive. Each of the embodiments illustrated and described in the following paragraphs thereby implements a method whereby the Toeplitz matrix is augmented to produce either a circulant matrix or a symmetric matrix which, in each case, is diagonalizable via a frequency-domain transform operation. Diagonalizable matrices are much simpler and less computationally intensive to use in calculations. Thus, the equalization methods of the embodiments described aim to be simpler to implement compared to the prior art methods.

Figure 3:
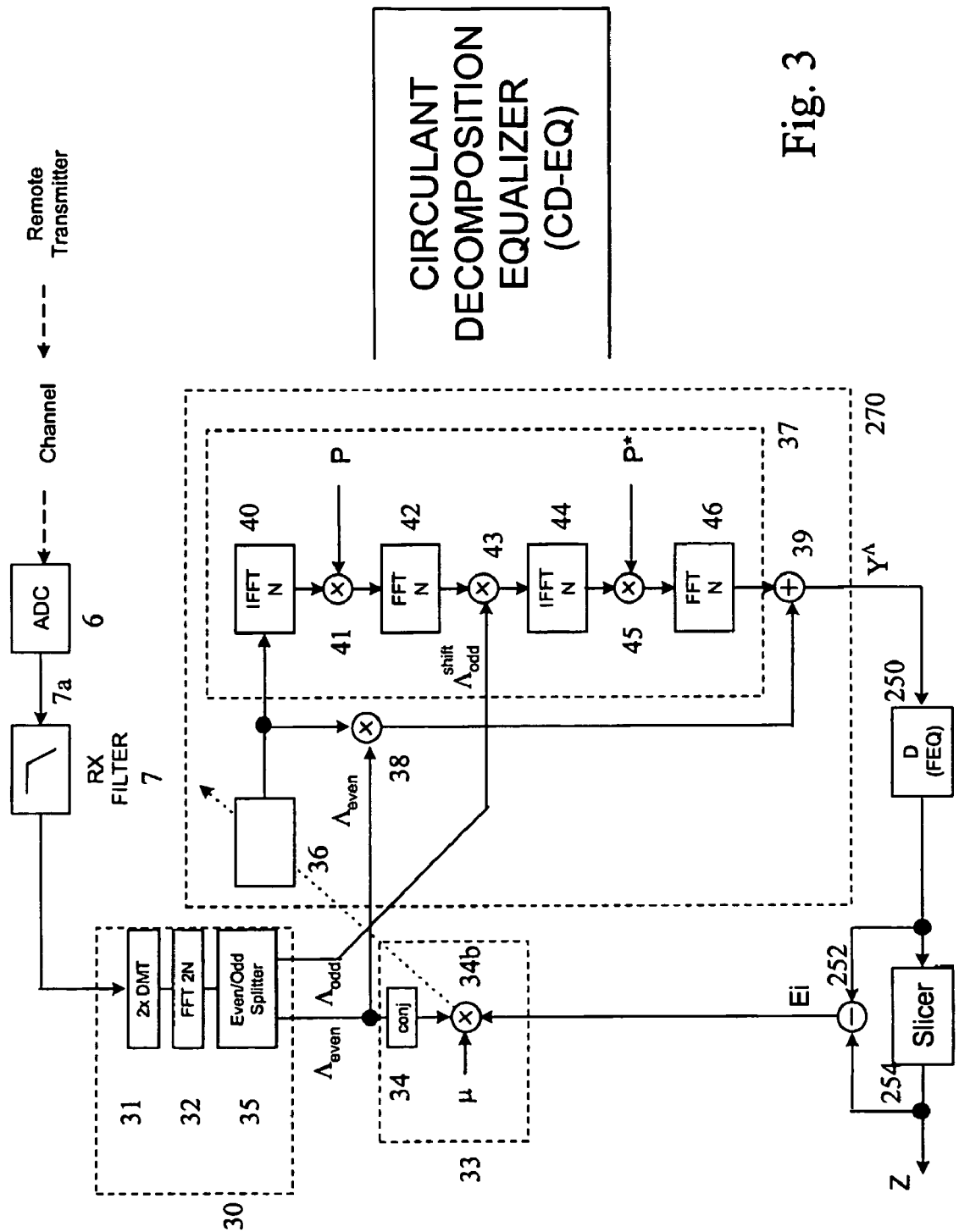
FIG. 3 shows an embodiment in the form of an equalizer corresponding to that of FIG. 2.

The embodiment illustrated in more detail in FIG. 3 is one way of implementing the following basic mathematical derivations:—the Toeplitz matrix T in equation (1) will first be augmented to form a (2N×2N) circulant matrix C where:

$$C = \begin{bmatrix} T & S \\ S & T \end{bmatrix} \qquad \text{eq. (3)}$$

$T_1 \equiv T(:,1) = 1^{st}$ column of $T$
$S_1 \equiv S(:,1) = 1^{st}$ column of $T$
$C_1 \equiv \begin{bmatrix} T_1 \\ S_1 \end{bmatrix} = 1^{st}$ column of $C$ and, $$S = \begin{bmatrix} x_1^i & x_N^i & x_{N-1}^i & \ldots & & x_3^i & x_2^i \\ x_{L+2}^{i-1} & & & & & & x_3^i \\ \ldots & & & & & & \\ x_{N-1}^{i-1} & & & & & & \\ x_N^{i-1} & & & \ldots & & \ldots & \\ x_{N-L+1}^i & & & & & & \\ \ldots & & & & & & x_{N-1}^i \\ x_{N-1}^i & & & & & & x_N^i \\ x_N^i & x_{N-1}^i & \ldots & x_{N-L+1}^i & x_N^{i-1} & x_{N-1}^{i-1} & \ldots & x_{L+2}^{i-1} & x_1^i \end{bmatrix} \quad \text{eq. (4)}$$

where S is derived from the elements of T. The matrix C is thereby circulant such that $$C = \begin{bmatrix} T & S \\ S & T \end{bmatrix} = F_{2N}^{-1} \cdot diag(\lambda_1 \ldots \lambda_{2N}) \cdot F_{2N} \qquad \text{eq. (5)}$$

where $$\Lambda = \begin{bmatrix} \lambda_1 \\ \lambda_2 \\ \ldots \\ \lambda_{2N} \end{bmatrix} = fft_{2N}(C_1) \qquad \text{eq. (6)}$$

in accordance with common general knowledge of matrix algebra whereby a circulant matrix can always be written as a product of its Fourier transform $F_{2N}$ with a diagonal matrix and with its inverse Fourier transform. The vector $C_1$ is the first column of matrix C.

By decomposing the Toeplitz matrix T into a sum of a circulant matrix (T+S), and a skew-circulant matrix (T−S), it is possible to write:

$$2T=(T+S)+(T-S) \qquad \text{eq. (7)}$$

for which the eigenvalues of the circulant matrix are given by, $$\Lambda_{even}=eig(T+S)=fft_N(T+S)_1=\Lambda(1:2:end-1) \qquad \text{eq. (8)}$$

and the eigenvalues of the skew-circulant matrix are given by;

$$\Lambda_{odd}=eig(T-S)=\Lambda(2:2:end). \qquad \text{eq. (9)}$$

The real-valued skew-circulant matrix (T−S) can be put in a complex circulant form by means of the diagonal operator P, where;

$$P \equiv diag(e^{-j\pi n/N}) \quad (n = 0 \ldots N-1) \qquad \text{eq. (10)}$$

$$T - S = P^*A_CP$$
$$= P^*F_N^*F_NA_CF_N^*F_NP$$
$$= P^*F_N^*diag(\Lambda_{odd})F_NP$$

Thus, restating the equation (eq. (1)) for the dispersion affected transmitted samples output as;

$$y_i=T\cdot h \qquad \text{eq. (11)}$$

and thus, $$2y_i=(T+S)h+(T-S)h \qquad \text{eq. (12)}$$

one arrives at the result;

$$2Y_i=diag(\Lambda_{even})H+F_NP^*F_N^*diag(\Lambda_{odd})F_NPF_N^*H \qquad \text{eq. (13)}$$

where $F_N$ is a Fourier transform operator, and $F_N^*$ is its inverse operator.

This result permits an estimate of $Y_i$ to be generated directly in the frequency-domain as follows:

$$E_i = Y_i - \frac{1}{2}\{diag(\Lambda_{even}) + F_NP^*F_N^* \cdot diag(\Lambda_{odd}) \cdot F_NPF_N^*\} \cdot W_i \qquad \text{eq. (14)}$$

where the $W_i$ are frequency-domain equalization parameters, which may be updated according to the adaptive update formula;

$$W_{i+1} = $$
$$W_i + \frac{1}{2}\mu\{diag(\Lambda_{even}) + F_NP^*F_N^* \cdot diag(\Lambda_{odd}) \cdot F_NPF_N^*\}^* \cdot E_i \qquad \text{eq. (15)}$$

where $E_i$ is the dispersion suppressed frequency-domain receive block. The updated equalization parameters $W_{i+1}$ may be calculated adaptively using known adaptive update algorithms to estimate the value of the scalar weighting term $\mu$, such as the Least Mean Square (LMS) or MMSE (Minimum Mean Square Error) adaptive update algorithms for example, as is well known in the art.

In FIG. 3, there is illustrated an equalizer comprising a convertor 30 connected to the output of the receive filter. The convertor comprises a 2xDMT sampler unit 31 for sampling pairs of consecutive DMT transmit blocks/symbols "$u_{i-1}$" and "$u_i$" and generating the 2Nx1 vector $[T_1;S_1]$ therefrom for input to a fast Fourier transform (FFT) unit 32. The FFT unit 32 generates a frequency domain block comprising 2N or more frequency-domain data samples, and passes the block into an "even/odd splitter" signal divider unit 35. The signal divider unit 35 is arranged to generate a first sub-block diag ($\Lambda_{even}$) and a second sub-block diag($\Lambda_{odd}$) which are each derived from the frequency domain block vector derived from the input received from the 2xDMT unit 31. The first sub-block comprises the even-numbered (i.e. $2^{nd}$, $4^{th}$, $6^{th}$, . . . )

data elements of the frequency domain block while the second sub-block comprises the remaining odd-numbered elements thereof. The signal divider unit 35 outputs each of the first and second sub-blocks on separate output ports.

The convertor 30 is arranged to input only the first sub-block diag($\Lambda_{even}$) to a conjugator unit 34 of an equalization parameter updating unit 33. The conjugator unit 34 is arranged to form the complex conjugate of data input thereto and to output the result to multiplier unit 34b. The convertor is arranged to output both the first sub-block and the second sub-block diag($\Lambda_{odd}$) to separate multiplier units 38 and 43 respectively for subsequent use as will be explained below.

The multiplier unit 34b of the equalizer is arranged to receive as input the complex conjugate of the first sub-block diag($\Lambda_{even}$) from the conjugator unit 34, a scalar weighting term calculated according to an LMS or MMSE algorithm (not shown) such as is well known in the art and a frequency-domain block $E_i$ output by the subtractor 252 described below.

The multiplier unit 34b is operable to generate frequency domain equalization update parameters by multiplying together the inputs received thereby to form the quantity;

$$\mu\{diag(\Lambda_{even})\}^* \cdot E_i. \qquad \text{eq.(16)}$$

Updating of the frequency-domain suppression parameters W is performed if needed, which depends on the updating LMS or MMSE algorithm employed, and on how rapidly the transmission path characteristics are changing. The update, when applied, is input to a suppression parameter generator 36 by the updating unit 33. The suppression parameter generator 36 contains either initial or earlier suppression parameters $W_i$ which, upon receipt of update parameters from the updating unit 33, are updated by the suppression parameter generator 36 to form new parameters $W_{i+1}$ according to the formula:

$$W_{i+1} = W_i + \mu\{diag(\Lambda_{even})\}^* \cdot E_i \qquad \text{eq.(17)}$$

The suppression parameter generator 36 and the convertor 30 respectively provide suppression parameters (when updated or otherwise) and frequency domain blocks as an input to a suppressor 100. The suppressor is arranged to receive first and second frequency domain sub-blocks from the signal divider unit 35. The suppressor comprises a first multiplier unit 38, a transformer unit 37 and an adder unit 39. The signal divider unit 35 is arranged to generate an even sub-block diag($\Lambda_{even}$) and an odd sub-block diag($\Lambda_{odd}$) and to direct the even sub-block to an input of the first multiplier unit 38. Simultaneously the odd sub-block is directed to an input of the transformer unit 37 so as to be transformed thereby according to a first predetermined transform operation.

The suppression parameter generator 36 is arranged to simultaneously input suppression parameters to the first multiplier unit 38 and the transformer unit 37 for pre-multiplication by the even sub-block and the odd sub-block (transformed according to the first transform operation) respectively thereby to produce a first and a second suppression sub-component. The outputs of the first multiplier unit 38 and the transformer means 37 are directed to inputs of the adder unit 39 which adds those inputs together to provide as output a frequency-domain suppression component $Y^\Lambda$, as defined in the second term of eq.(14), namely:

$$Y^\Lambda = \frac{1}{2}\{diag(\Lambda_{even}) + F_N P^* F_N^* \cdot diag(\Lambda_{odd}) \cdot F_N P F_N^*\} \cdot W_i$$

The transformer unit 37 comprises the following components connected in sequence: a first N-point inverse fast Fourier transform (IFFT) unit 40, a first operator multiplier unit 41, a first N-point fast Fourier transform unit (FFT) 42, a second multiplier unit 43, a second N-point inverse fast Fourier transform (IFFT) unit 44, a second operator multiplier unit 45, and a second N-point fast Fourier transform unit (FFT) 46.

The first N-point inverse fast Fourier transform (IFFT) unit 40 is arranged to receive suppression parameters input from the suppression parameter generator 36, to transform those parameters accordingly and to output the result as a first input of the first operator multiplier unit 41. The first operator unit is also arranged to receive as a second input a parameter block representing the diagonal operator P, to pre-multiply its first input with the parameter block of its second input and to output the result to an input of the first N-point fast Fourier transform unit 42. The first N-point fast Fourier transform (FFT) unit 42 is arranged to transform its input accordingly and to output the result as a first input of the second multiplier unit 43.

The second multiplier unit is also arranged to receive as a second input the odd sub-block from the convertor, to pre-multiply its first input with its second input and to output the result to the input of the second N-point inverse fast Fourier transform (IFFT) unit 44.

The second N-point inverse fast Fourier transform (IFFT) unit 44 is arranged to transform its input accordingly and to output the result as a first input of the second operator multiplier unit 45. The second operator unit is also arranged to receive as a second input a parameter block representing the inverse of diagonal operator P, to pre-multiply its first input with the parameter block of its second input and to output the result to an input of the first fast Fourier transform unit 46. The second N-point fast Fourier transform (FFT) unit 46 is arranged to transform its input accordingly and to output the result as the second suppression sub-component and the output of the transformer unit 37.

This is added by adder 39 to the output of multiplier 38 to give the output of the equalizer. This is fed to a conventional FEQ function 250, followed by slicer 254 for recovering the transmitted data stream. The slicer 254 in ADSL/DMT can also be implemented as a demapper. However, merely for use with the equalizer, recovery of the full bit-stream is not necessary but only the per-tone error Ei is required i.e. the difference between the received (equalized) constellation point and the 'decided' point which corresponds to the sent constellation in case of no transmission-errors. Hence, a full demapper is not required. An error signal Ei is generated by subtractor 252 to give an indication of a level of ISI/ICI remaining. After the subtraction, Ei contains only the residual ISI/ICI in the frequency-domain for each tone (i.e. subcarrier of the multi-carrier modulation), this is the error which drives the update as the aim of the equalizer is to put this error to zero. Hence, Ei is fed back to the updater unit 33 as described above for use in frequency-domain update parameter generation for updating the parameter generator 36 to construct the quantity arising in eq.(16), namely:

$$\mu \cdot \{diag(\Lambda_{even})\} \cdot W \qquad \text{eq.(18)}$$

The embodiments described can give precision equivalent to an N-taps TEQ FIR.

Another advantage is compatibility: existing algorithms for calculation of TEQ/FEQ coefficients can be directly used with the CD-EQ receiver (the V vector is just the FFT over N points of the TEQ taps). So, existing equalizers can be replaced by those of the embodiments described, by additionally converting the TEQ coefficients from the time domain to the frequency domain.

Notably the TEQ can be updated using normal MMSE algorithms for example directly in the frequency domain. Overall complexity can be comparable with traditional TEQ/FEQ receivers (the structure can be efficiently implemented with DSP cores). Any of the functions shown can be implemented using standard software languages or procedures, for execution on standard hardware such as general purpose microprocessors, DSPs, or application specific integrated circuits, for example. The software contains code which may execute on any suitable computing device or processing engine having memory such as a microprocessor, e.g. Pentium IV supplied by Intel Corp. USA or similar, or a programmable gate array such as a Field Programmable Gate Array, Programmable Array Logic, Programmable Logic Array or similar. The software may also be stored on a suitable data carrier, e.g. an optical disk such as a CD-ROM, a DVD-ROM; magnetic tape; a hard disk; a memory of a network element in a telecommunications network or in a personal computer or a work station such as a UNIX workstation.

Figure 4:
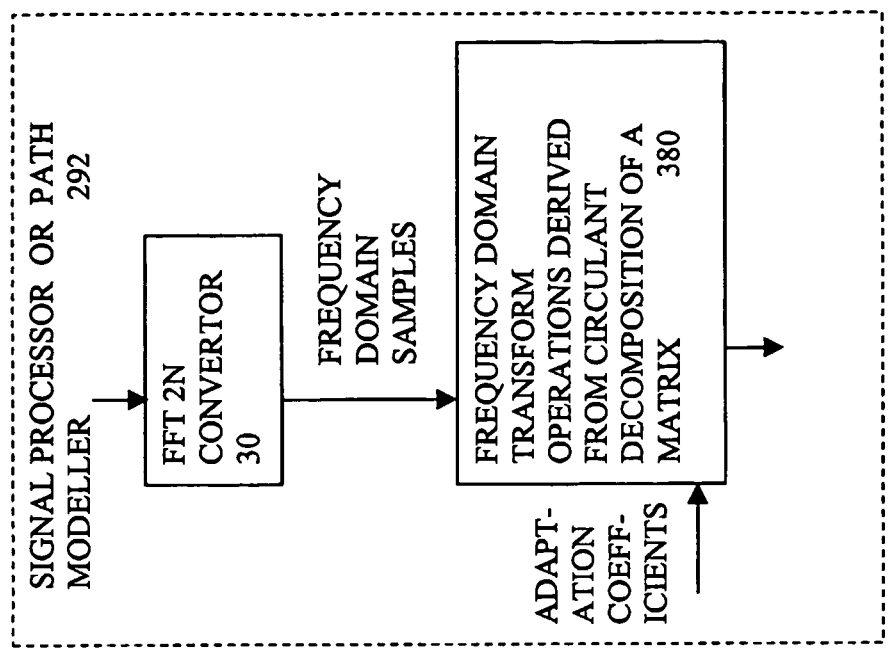
FIG. 4 shows an embodiment in the form of a signal processor.

FIG. 4 shows how corresponding techniques can be used for other signal processing applications, including modeling transmission path characteristics for example. A signal processor 292 includes a convertor 30 for outputting frequency domain samples to an element 380 for carrying out frequency domain operations. These are transform operations arranged to achieve an equivalent operation on a Toeplitz matrix by vector multiplication on the original time domain signal. The transforms are derived from circulant decomposition of the original Toeplitz matrix into a sum of a circulant and skew circulant matrix components. This can be implemented using the transformer 37 of FIG. 3. Adaptation using feedback in the form of an error signal is enabled in the form of vector values which are converted to frequency domain parameters. The error Ei is namely an N-length complex vector which carries the residual ISI/ICI error for each tone. Again this can be implemented as shown in FIG. 3. The signal processor can be used in echo cancellation as described in the above referenced European patent application.

Figure 5:
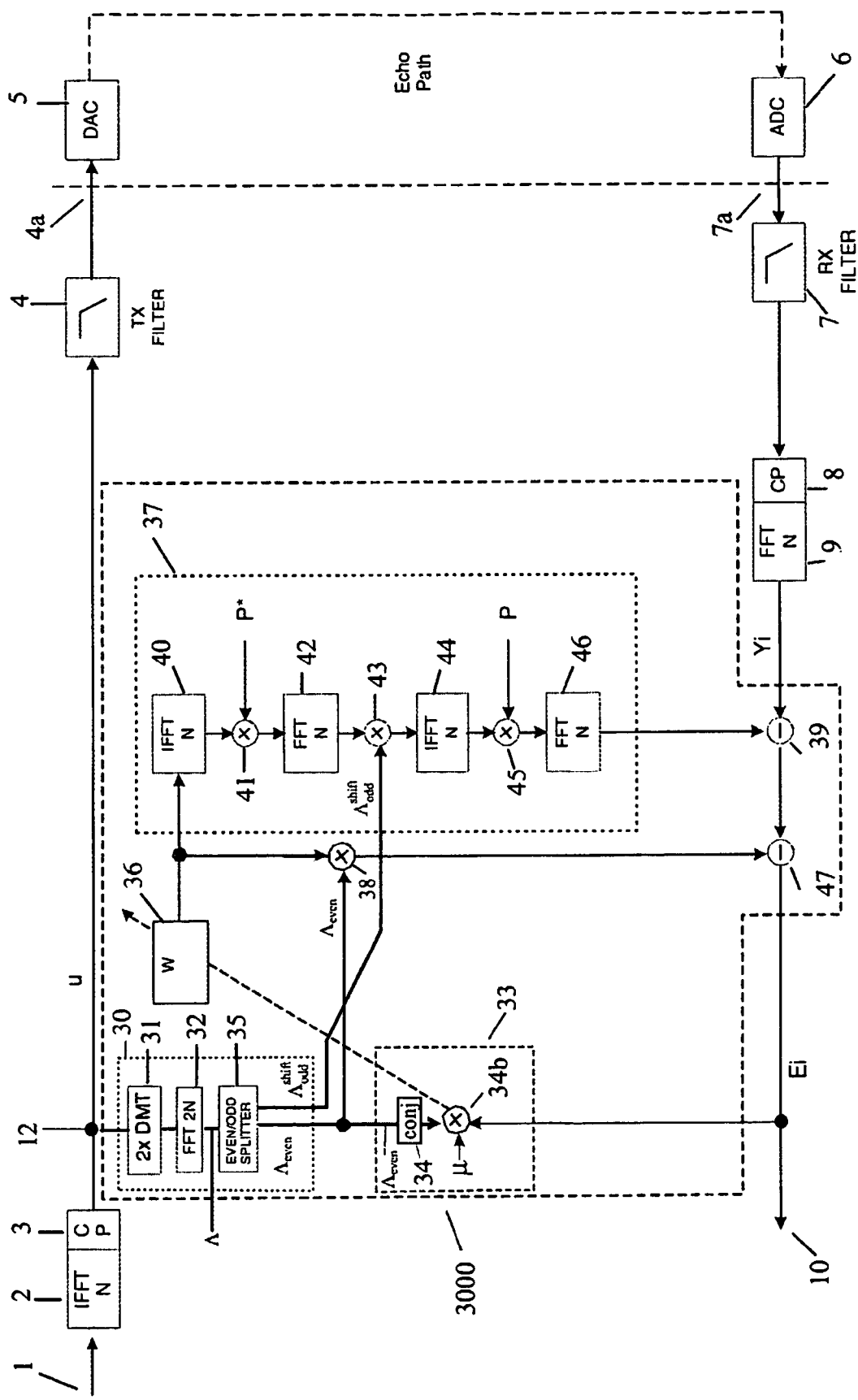
FIG. 5 shows an echocanceller having some common aspects with the present invention.

FIG. 5 is a block diagram of an echo canceller disclosed in European patent application EP 02291217. The common features between this echo canceller and an equaliser of this invention is a dispersive channel modeling device which is arranged to use a sequence of consecutive samples of a multicarrier signal, the sequence having a length of at least two symbols, to derive oversampled frequency domain signals for simulation of dispersion caused by the channel. The subtraction point in the canceller is replaced by the "slicer" in the equalizer. Also, the training signal is the transmitted signal in the canceller and the received signal in the equalizer. In the echo-canceller shown in FIG. 5, the P and P* vectors are exchanged order compared to the description above, however this makes no substantial difference. From a mathematical point of view the two versions give the same output. With reference to each of FIGS. 1 to 7, there is illustrated a discrete multi-tone (DMT) transceiver employing an echo canceller according to a respective embodiment of the present invention. The transceiver may be part of a modem, e.g. an ADSL modem. An echo canceller, a receiver including the echo canceller, a transceiver including the receiver and a modem including the transceiver in accordance with the present invention may each be constructed as a separate item, e.g. each as a Printed Circuit Board or as an Integrated circuit or ASIC.

The transceiver of FIG. 5 includes a transmitter portion having a data input 1 for receiving data to be transmitted, and a signal output 4a for outputting transmit signals to a digital-to-analog converter (DAC) 5 for subsequent transmission. The transceiver also includes a receiver portion having a receive signal input 7a for receiving signals transmitted from remote transceivers via an analog-to-digital converter (ADC) 6, and a receive data output 10 for outputting echo-cancelled received data. An echo path exists between the transmitter portion output 4a and the receiver portion input 7a and defines a path through which echo signals may pass. The echo path includes at least a hybrid transformer (not shown) of the transceiver and may include other elements of the transceiver located outside the transmitter portion and the receiver portion of the transceiver.

In the transmitter portion of the transceiver, an inverse fast Fourier transform unit (IFFT) 2 receives input data in the form of frequency-domain DMT data blocks comprised of N complex-valued data elements. The IFFT unit 2 modulates each of the N data elements with N carrier signals at evenly spaced frequency intervals thereby converting the N frequency-domain data elements into a block (or "symbol") of N real-valued time-domain samples.

A cyclic prefix block (CP) 3 copies the last L samples of the N time-domain sample block to form a cyclic prefix therewith, and prepends the cyclic prefix to the beginning of the block. This is done in order to eliminate inter-block interference at the remote transceiver to which the block of (N+L) samples is subsequently transmitted. The output of the cyclic prefix block 3 is DMT transmit signals "u" comprising a plurality of time-domain multi-carrier transmit blocks/symbols.

The DMT transmit signals "u" are subsequently passed through a transmitter low-pass filter unit 4 and thence through a digital-to-analogue converter 5 prior to duplex transmission to a remote transceiver.

The receiver portion input 7a is coupled to an analogue-to-digital converter (ADC) 6 arranged to digitise received DMT time-domain signals received from a remote transceiver, and to pass those signals, so digitised, through a receiver filter 7.

Echo cancellation is subsequently applied to the signals output of the receive filter 7 (either immediately or subsequent to further processing of those signals) to produce DMT time-domain echo-cancelled receive signals "e". A cyclic prefix extractor 8 subsequently receives the receive signals "e" and extracts from them any cyclic prefix prepended thereto.

A fast Fourier transform block (FFT) 9 receives the output of the cyclic prefix extractor 8 and de-modulates each of the N real-valued time-domain samples of the echo-cancelled prefix-extracted time-domain samples so as to produce as output therefrom a frequency-domain echo-cancelled receive block "$E_i$" comprising N complex-valued data samples.

An echo cancellation unit couples the transmitter portion of the transceiver to the receiver portion thereof between the respective inputs and outputs of both said transceiver portions. The echo canceller is arranged to provide echo emulation y of an echo signal produced by the echo path between the transmitter and transceiver portions and to subtract an emulated echo from signals received at the receive portion.

As is commonly known, for h being the impulse response of the echo path, the N-point vector y of echo channel output samples can be represented as:

$$y_i = T_{i,i-1} \cdot h \qquad \text{eq.(19)}$$

where $T_{i,i-1}$ is an N×N Toeplitz matrix with symbol length N (i.e. the number of unique time-domain samples per DMT block/symbol excluding any cyclic prefix attached thereto) and cyclic prefix length L, and is derived from a pair of successive multi-carrier transmit blocks "$u_{i-1}$" and "$u_i$" each being N+L samples in length, such that:

eq. (20)

$$T = \begin{bmatrix} \overbrace{x_1^i \quad \vdots \quad x_N^i \quad x_{N-1}^i \quad \ldots \quad x_{N-L+1}^i}^{CP \text{ of symbol } i} \overbrace{x_N^{i-1} \quad x_{N-1}^{i-1} \quad \ldots \quad x_{L+2}^{i-1}}^{\text{symbol } i-1} \\ x_2^i \quad \vdots \quad \quad \quad \quad \quad \quad \quad \quad \quad \quad \quad \ldots \\ \ldots \quad \vdots \quad \quad \quad \quad \quad \quad \quad \quad \quad \quad \quad x_{N-1}^{i-1} \\ \quad \vdots \quad \quad \quad \quad \quad \quad \quad \quad \quad \quad \quad x_N^{i-1} \\ \quad \vdots \quad \quad \quad \quad \ldots \quad \quad \quad \quad \quad x_{N-L+1}^i \\ \quad \vdots \quad \quad \quad \quad \quad \quad \quad \quad \quad \quad \quad \ldots \\ \ldots \quad \vdots \quad \quad \quad \quad \quad \quad \quad \quad \quad \quad \quad x_{N-1}^i \\ x_{N-1}^i \quad \vdots \quad \quad \quad \quad \quad \quad \quad \quad \quad \quad \quad x_N^i \\ x_N^i \quad \vdots \quad x_{N-1}^i \quad \quad \quad \ldots \quad \quad \quad x_2^i \quad x_1^i \end{bmatrix}$$

Samples $\{x^{i-1}\}$ are taken from the cyclic prefix of the former block "$u_{i-1}$" and samples $\{x^i\}$ are taken from the latter "$u_i$". The Toeplitz matrix is not diagonalisable via a fast Fourier transform and solving this equation is computationally intensive. The embodiment illustrated in FIG. 5 and described in the following paragraphs implements a method whereby the Toeplitz matrix is augmented to produce either a circulant matrix or a symmetric matrix which, in each case, is diagonalisable via a frequency-domain transform operation. Diagonalisable matrices are much simpler and less computationally intensive to use in calculations. Thus, the echo emulation and cancellation methods of the subject invention aim to be simpler compared to the prior art methods.

Referring to FIG. 5, the embodiment illustrated therein implements all the following basic mathematical derivations:—the Toeplitz matrix T in equation (19) will first be augmented to form a (2N×2N) circulant matrix C where:

$$C = \begin{bmatrix} T & S \\ S & T \end{bmatrix} \quad \text{eq. (21)}$$

$T_1 \equiv T(:, 1) = 1^{st}$ column of $T$
$S_1 \equiv S(:, 1) = 1^{st}$ column of $T$
$C_1 \equiv \begin{bmatrix} T_1 \\ S_1 \end{bmatrix} = 1^{st}$ column of $C$ and, $$S = \begin{bmatrix} x_1^i & x_N^i & x_{N-1}^i & \ldots & & & x_3^i & x_2^i \\ x_{L+2}^{i-1} & & & & & & & x_3^i \\ \ldots & & & & & & & \\ x_{N-1}^{i-1} & & & & & & & \\ x_N^{i-1} & & & \ldots & & & \ldots & \\ x_{N-L+1}^i & & & & & & & \\ \ldots & & & & & & & x_{N-1}^i \\ x_{N-1}^i & & & & & & & x_N^i \\ x_N^i & x_{N-1}^i & \ldots & x_{N-L+1}^i & x_N^{i-1} & x_{N-1}^{i-1} & \ldots & x_{L+2}^{i-1} & x_1^i \end{bmatrix} \quad \text{eq. (22)}$$

where S is derived from the elements of T. The matrix C is thereby circulant such that $$C = \begin{bmatrix} T & S \\ S & T \end{bmatrix} = F_{2N}^{-1} \cdot diag(\lambda_1 \ldots \lambda_{2N}) \cdot F_{2N} \quad \text{eq. (23)}$$

where $$\Lambda = \begin{bmatrix} \lambda_1 \\ \lambda_2 \\ \ldots \\ \lambda_{2N} \end{bmatrix} = fft_{2N}(C_1) \quad \text{eq. (24)}$$

in accordance with common general knowledge of matrix algebra whereby a circulant matrix can always be written as a product of its Fourier transform $F_{2N}$ with a diagonal matrix and with its inverse Fourier transform. The vector $C_1$ is the first column of matrix C.

By decomposing the Toeplitz matrix T into a sum of a circulant matrix (T+S), and a skew-circulant matrix (T−S), it is possible to write:

$$2T=(T+S)+(T-S) \quad \text{eq. (25)}$$

for which the eigenvalues of the circulant matrix are given by, $$\Lambda_{even} = eig(T+S) = fft_N(T+S)_1 = \Lambda(1:2:end-1) \quad \text{eq. (26)}$$

and the eigenvalues of the skew-circulant matrix are given by;

$$\Lambda_{odd} = eig(T-S) = \Lambda(2:2:end) \quad \text{eq. (27)}$$

The real-valued skew-circulant matrix (T−S) can be put in a complex circulant form by means of the diagonal operator P, where;

$$P \equiv diag(e^{-j\pi n/N}) \quad (n = 0 \ldots N-1) \quad \text{eq. (28)}$$

$$T - S = P A_C P^*$$
$$= P F_N^* F_N A_C F_N^* F_N P^*$$
$$= P F_N^* diag(\Lambda_{odd}^{shift}) F_N P^*$$

The N×1 vector $\Lambda_{odd}^{shift}$ is computable directly from the eigenvalue vector $\Lambda$ as follows;

$$\Lambda_{odd}^{shift} = \begin{bmatrix} \lambda_{2N} \\ \lambda_2 \\ \lambda_4 \\ \ldots \\ \lambda_{2N-2} \end{bmatrix} \qquad \text{eq. (29)}$$

Thus, restating the equation (eq. (19)) for the echo-channel sample output as;

$$y_i = T \cdot h$$

and thus, $$2y_i = (T+S)h + (T-S)h \qquad \text{eq. (30)}$$

one arrives at the result;

$$2Y_i = \text{diag}(\Lambda_{even})H + F_N P F_N^* \cdot \text{diag}(\Lambda_{odd}^{shift}) F_N P^* F_N^* H \qquad \text{eq. (31)}$$

where $F_N$ is a Fourier transform operator, and $F_N^*$ is its inverse operator.

This result permits an estimate of $Y_i$ to be to be generated directly in the frequency-domain as follows:

$$E_i = Y_i - \frac{1}{2}\{\text{diag}(\Lambda_{even}) + F_N P F_N^* \cdot \text{diag}(\Lambda_{odd}^{shift}) \cdot F_N P^* F_N^*\} \cdot W_i \qquad \text{eq. (32)}$$

where the $W_i$ are frequency-domain echo parameters, which may be updated according to the adaptive update formula;

$$W_{i+1} = \qquad \text{eq. (33)}$$
$$W_i + \frac{1}{2}\mu\{\text{diag}(\Lambda_{even}) + F_N P F_N^* \cdot \text{diag}(\Lambda_{odd}^{shift}) \cdot F_N P^* F_N^*\}^* \cdot E_i$$

where $E_i$ is the echo-cancelled frequency-domain receive block. The updated echo parameters $W_{i+1}$ may be calculated adaptively using known adaptive update algorithms to estimate the value of the scalar weighting term $\mu$, such as the Least Mean Square (LMS) adaptive update algorithm as is well known in the art.

It is to be noted that decimation may be used to derive the relation;

$$Y^F = \frac{1}{2}\{\text{diag}(\Lambda_{even}^F) + \qquad \text{eq. (34)}$$
$$F_{N/2} \cdot P^D \cdot P^D \cdot F_{N/2}^{-1} \cdot \text{diag}(\Lambda_{odd}^F) \cdot F_{N/2} \cdot P^{D*} \cdot F_{N/2}^{-1}\} \cdot W^F$$

illustrating that one may approximate the exact (un-decimated) formula above by decimating in time by 2 and echo-cancelling over the first N/2 samples of a multi-carrier receive signal only.

In such a decimated technique, the components of the above decimated formula are given by;

$$W^F = \{W(i) + W(i+N/2)\} i=1, \ldots, N/2 \qquad \text{eq.(35)}$$

$$\Lambda^F = \{\Lambda(i) + \Lambda(i+N)\} i=1, \ldots, N \qquad \text{eq.(36)}$$

$$\Lambda^F_{even} = \{\Lambda^F(2i)\} i=1, \ldots, N/2 \qquad \text{eq.(37)}$$

$$\Lambda^F_{odd} = [\Lambda^F(N-1), \Lambda^F(1), \ldots, \Lambda^F(N-3)] \qquad \text{eq.(38)}$$

$$P^D = \text{diag}(\{e^{-j2\pi k/N}\}) \, k=1, \ldots, N/2 \qquad \text{eq.(39)}$$

Equation (15) may be rearranged by swapping the operators P and P* and replacing the vector $\Lambda_{odd}^{shift}$ with $\Lambda_{odd}$. The result is the formula:

$$W_{i+1} = W_i + \frac{1}{2}\mu\{\text{diag}(\Lambda_{even}) + F_N P^* F_N^* \cdot \text{diag}(\Lambda_{odd}) \cdot F_N P F_N^*\}^* \cdot E_i \qquad \text{eq. (40)}$$

This formula, equation (40), permits an update of the frequency-domain echo parameters $W_i$ using the vectors $\Lambda_{even}$ and $\Lambda_{odd}$. Equation (40) may be simplified by disregarding the second term involving $\Lambda_{odd}$ and writing:

$$W_{i+1} = W_i + \mu \cdot \text{diag}(\Lambda_{even})^* \cdot E_i \qquad \text{eq. (41)}$$

From which one may easily derive an update of time-domain echo parameters $w_i$ via an inverse (fast) Fourier transform (IFFT):

$$w_{i+1} = \text{ifft}(W_n) \qquad \text{eq.(42)}$$

Thus, the echo-path is estimated in the frequency-domain, and echo cancellation may then be implemented in the time-domain according to equation (42). The time-domain coefficients, $W_i$, can be directly used as "taps" for a Finite Impulse Response (FIR) filter in a manner known in the art.

$$W_{i+1} = W_i + \mu \cdot \text{diag}(\Lambda_{even})^* \cdot E_i \qquad \text{eq. (43)}$$

The echo canceller 3000 comprises a transmit block generator 30 connected to the output of the cyclic prefix unit 3 (at point 12). The transmit block generator comprises a 2×DMT sampler unit 31 for sampling pairs of consecutive DMT transmit blocks/symbols "$u_{i-1}$" and "$u_i$" and generating the 2N×1 vector $[T_1; S_1]$ therefrom for input to a fast Fourier transform (FFT) unit 32. The FFT unit 32 generates a transmit block comprising 2N frequency-domain data samples, and inputs the transmit block into an "even/odd splitter" signal divider unit 35. The signal divider unit 35 is arranged to generate a first transmit sub-block diag($\Lambda_{even}$) and a second transmit sub-block diag($\Lambda_{odd}^{shift}$) which are each derived from the transmit block vector derived from the input received from the 2×DMT unit 31. The first transmit sub-block comprises the even-numbered (i.e. $2^{nd}, 4^{th}, 6^{th}, \ldots$) data elements of the transmit block while the second transmit sub-block comprises the remaining odd-numbered elements thereof. The signal divider unit 35 outputs each of the first and second transmit sub-blocks on separate output ports.

The transmit block generator 30 is arranged to input only the first transmit sub-block diag($\Lambda_{even}$) to a conjugator unit 34 of an echo parameter updating unit 33. The conjugator unit 34 is arranged to form the complex conjugate of data input thereto and to output the result to multiplier unit 34b. The transmit block generator is arranged to output both the first transmit sub-block and the second transmit sub-block diag ($\Lambda_{odd}^{shift}$) to separate multiplier units 38 and 43 respectively for subsequent use as will be explained below.

The multiplier unit 34b of the echo canceller is arranged to receive as input the complex conjugate of the first transmit sub-block diag($\Lambda_{even}$) from the conjugator unit 34, a scalar weighting term calculated according to an LMS algorithm such as is well known in the art and an echo-cancelled frequency-domain receive block $E_i$.

The multiplier unit 34b is operable to generate frequency domain echo update parameters by multiplying together the inputs received thereby to form the quantity, arising in eq. (43), namely;

$$\mu\{\text{diag}(\Lambda_{even})\}^* \cdot E_i.\qquad\text{eq.}(44)$$

Updating of the frequency-domain echo parameters W is performed on condition that such an update is needed, this is a condition predetermined by the updating LMS algorithm employed. The update, when applied, is input to an echo parameter generator 36 by the updating unit 33. The echo parameter generator 36 contains either initial or earlier echo parameters $W_i$ which, upon receipt of update parameters from the updating unit 33, are updated by the echo parameter generator 36 to form new parameters $W_{i+1}$ according to the formula given by eq.(43), namely:

$$W_{i+1} = W_i + \mu\{\text{diag}(\Lambda_{even})\}^* \cdot E_i$$

The echo parameter generator 36 and the transmit block generator 30 respectively provide echo parameters (when updated or otherwise) and transmit blocks as an input to an echo component generator. The echo component generator in question is arranged to receive first and second transmit sub-blocks from the signal divider unit 35. The echo component generator comprises a first multiplier unit 38, a transformer unit 37 and an adder unit 39. The signal divider unit 35 is arranged to generate a first transmit sub-block $\text{diag}(\Lambda_{even})$ and a second transmit sub-block $\text{diag}(\Lambda_{odd}^{shift})$ and to direct the first transmit sub-block to an input of the first multiplier unit 38, while simultaneously to direct the second transmit sub-block to an input of the transformer unit 37 so as to be transformed thereby according to a first predetermined transform operation.

The echo parameter generator 36 is arranged to simultaneously input echo parameters to the first multiplier unit 38 and the transformer unit 37 for pre-multiplication by the first transmit sub-block and the second transmit sub-block (transformed according to the first transform operation) respectively thereby to produce a first and a second echo sub-component. The outputs of the first multiplier unit 38 and the transformer means 37 are directed to inputs of the adder unit 39 which adds those inputs together to provide as output a frequency-domain echo component $Y^\wedge$, as defined in the second term of eq.(22), namely:

$$Y^\wedge = \frac{1}{2}\{\text{diag}(\Lambda_{even}) + F_N P F_N^* \cdot \text{diag}(\Lambda_{odd}^{shift}) \cdot F_N P^* F_N^*\} \cdot W_i$$

The transformer unit 37 comprises the following components connected in sequence: a first N-point inverse fast Fourier transform (IFFT) unit 40, a first operator multiplier unit 41, a first N-point fast Fourier transform unit (FFT) 42, a second multiplier unit 43, a second N-point inverse fast Fourier transform (IFFT) unit 44, a second operator multiplier unit 45, and a second N-point fast Fourier transform unit (FFT) 46.

The first N-point inverse fast Fourier transform (IFFT) unit 40 is arranged to receive echo parameters input from the echo parameter generator 36, to transform those parameters accordingly and to output the result as a first input of the first operator multiplier unit 41. The first operator unit is also arranged to receive as a second input a parameter block representing the inverse of the diagonal operator P, to pre-multiply its first input with the parameter block of its second input and to output the result to an input of the first N-point fast Fourier transform unit 42. The first N-point fast Fourier transform (FFT) unit 42 is arranged to transform its input accordingly and to output the result as a first input of the second multiplier unit 43.

The second multiplier unit is also arranged to receive as a second input the second transmit sub-block from the transmit block generator, to pre-multiply its first input with its second input and to output the result to the input of the second N-point inverse fast Fourier transform (IFFT) unit 44.

The second N-point inverse fast Fourier transform (IFFT) unit 44 is arranged to transform its input accordingly and to output the result as a first input of the second operator multiplier unit 45. The second operator unit is also arranged to receive as a second input a parameter block representing the diagonal operator P, to pre-multiply its first input with the parameter block of its second input and to output the result to an input of the first fast Fourier transform unit 46. The second N-point fast Fourier transform (FFT) unit 46 is arranged to transform its input accordingly and to output the result as the second echo sub-component and the output of the transformer unit 37.

The echo canceller is connected to the receiver portion of the transceiver via a first subtracting unit 39 having as one input the output of the second N-point fast Fourier transform (FFT) unit 46 and as another input the output of the EFT unit 9 of the receiver portion. A second subtracting unit 47, together with a first subtracting unit 39, couples the echo canceller to the receiver portion of the transceiver. The first subtracting unit 39 receives as input a frequency-domain receive block and a second echo sub-component, and subtracts the latter from the former and outputs the result. The second subtracting unit 47 receives as input the output of the first subtracting unit 39 and a second echo sub-component, and subtracts the latter from the former and output the result as frequency-domain echo-cancelled receive block $E_i$.

The receive block generator of the echo canceller comprises a data input connected to the output of the second subtractor unit 47 of the echo canceller, and a data output connected to a data input of the updater unit 33 as described above. Thus, samples of the frequency-domain echo-cancelled receive block $E_i$ are input to the updater unit 33 for use in frequency-domain update parameter generation.

The effect of the echo component generator is to construct the quantity arising in eq.(44), namely:

$$\mu \cdot \{\text{diag}(\Lambda_{even})\}^* W \qquad\text{eq.}(44)$$

Note that in alternative embodiments according to the present invention, the parameter and transform blocks constructed by the echo component generator in constructing the quantity;

$$\frac{1}{2}\{\text{diag}(\Lambda_{even}) + F_N P F_N^* \cdot \text{diag}(\Lambda_{odd}^{shift}) \cdot F_N P^* F_N^*\} \cdot W_i \qquad\text{eq. }(45)$$

may be stored for use in generating update parameters in the update unit which may then easily construct the quantity;

$$\frac{1}{2}\mu\{\text{diag}(\Lambda_{even}) + F_N P F_N^* \cdot \text{diag}(\Lambda_{odd}^{shift}) \cdot F_N P^* F_N^*\}^* \cdot E_i$$

for use in full update parameter generation as in eq.(23) or eq.(30) and the embodiments implementing those equations.

Thus, it can be seen that echo emulation may be performed by adaptively generating echo parameters purely in the frequency-domain, and those echo parameters applied to frequency-domain echo emulation and echo cancellation.

As has been described above, a dispersive channel modeling device is disclosed, e.g. in an echo-canceller for a multi carrier transmission system that converts a multi carrier signal into sampled frequency domain signals; or in an equalizer for a multi carrier transmission system that converts a transmitted multi carrier signal into sampled frequency domain signals, and suppresses time domain delay dispersion, on the sampled frequency domain signals. It exploits circulant decomposition of a Toeplitz matrix to enable the computationally heavy evaluation of a matrix multiplied by a vector, to be avoided. Increased precision arises from the frequency domain processing being equivalent to a longer time domain FIR filter than is normally practical. The amount of compensation for different carriers can be adjusted, which can lead to increased precision.

Other variations will be apparent to those skilled in the art, having corresponding advantages to those set out above, within the scope of the claims.

What is claimed is:

1. An equalizer for a multi-carrier transmission system, for at least reducing delay dispersion in a signal, the equalizer comprising: a convertor arranged to use a sequence of consecutive samples of a multicarrier signal to derive oversampled frequency domain signals for reduction of dispersion of at least one symbol, the sequence having a length of at least two symbols; and a suppressor for suppressing time domain delay dispersion on the oversampled frequency domain signals using frequency-domain dispersion parameters, the suppressor being adaptive according to feedback provided by a suppressed dispersion frequency-domain output signal through updating of the frequency-domain dispersion parameters, the suppressor comprising: a parameter generator arranged to adaptively generate a set of updated frequency domain dispersion parameters to be implemented in the suppressor based at least in part, on an update; and an updating unit arranged to provide an update to the parameter generator based, at least in part, on the feedback; wherein the suppressor being is arranged to carry out Fourier transform based operations on odd frequency domain samples and separately carry out Fourier transform based operations on even frequency domain samples.

2. The equalizer of claim 1, the frequency-domain dispersion parameters being configurable to adjust the suppression per carrier.

3. The equalizer of claim 1, the frequency-domain dispersion parameters comprising a vector having a value for each of the carriers.

4. The equalizer of claim 1, the parameter generator being arranged to derive the frequency-domain dispersion parameters using an impulse response of the transmission path.

5. The equalizer of claim 1, wherein the converter is arranged to separate odd and even samples of the oversampled frequency domain signal, for separate processing.

6. The equalizer of claim 1, the Fourier transform based operations being equivalent to a time domain equalization in the frequency domain.

7. The equalizer of claim 6, the Fourier transform based operations being arranged to implement the equation:

$$2Y_i = \text{diag}(\Lambda_{even})W + F_N P^* F^*_N \text{diag}(\Lambda_{odd}) F_N P F_N^* W$$

where Y is the processed output, W are frequency domain signal processing parameters which can be used for adaptation, F is the Fourier transform operator, P is the constant diagonal operator $P \equiv \text{diag}(e^{jm/N})$ (n=0 ... N−1) and diag($\Lambda_{even}$) are even ones of frequency domain samples, and diag($\Lambda_{odd}$) are odd ones of frequency domain samples.

8. A receiver having a demodulator for recovering data from a multicarrier input signal, and the equalizer of claim 1 for equalizing the input signal.

9. A modem having the receiver of claim 8 and a transmitter.

10. Central office equipment or customer premises equipment having one or more of the modems of claim 9, each for coupling a subscriber line to a telecommunications network.

11. A method of equalizing for multi-carrier transmission using one or more processors, for at least reducing delay dispersion in a signal, the method comprising: converting a multi carrier signal into sampled frequency domain signals, the converting being arranged to use a sequence of consecutive samples of the multicarrier signal for reduction of dispersion of at least one symbol, where the sequence has a length, of at least two symbols; separating odd and even samples of the oversampled frequency domain signals before suppressing time domain delay dispersion on the sampled frequency domain signals; suppressing time domain delay dispersion on the sampled frequency domain signals using frequency-domain dispersion parameters to produce a suppressed dispersion frequency domain output signal; and updating the frequency-domain dispersion parameters using the one or more processors based, at least in part, on feedback provided by a suppressed dispersion frequency domain output signal.

12. A signal processor for use with a dispersive signal transmission path carrying multicarrier signals, the signal processor carrying out a time domain matrix type operation on at least one multicarrier signal, the signal processor comprising:

a converter arranged to convert the at least one multicarrier signal into oversampled frequency domain samples; and a transformer arranged to carry out frequency domain transform operations on the frequency domain samples using a processor, the converter being arranged to use a sequence of consecutive samples of the at least one multicarrier signal, the sequence having a length of at least two symbols and the transformed frequency domain samples being modified based on a frequency response of the dispersive signal transmission path, wherein the transform operations are based on the equation:

$$2Y_i = \text{diag}(\Lambda_{even})W + F_N P^* F^*_N \text{diag}(\Lambda_{odd}) F_N P F_N^* W$$

where Y is the processed output,

W are frequency domain signal processing parameters which can be adapted

F is the Fourier transform operator,

P is the diagonal operator, and

Diag($\Lambda_{even}$) are even ones of frequency domain samples, and diag($\Lambda_{odd}^{shift}$) are odd ones of frequency domain samples.

13. The signal processor of claim 12, the processor being adapted to carry out Fourier transform based operations separately on the odd and even frequency domain samples.

14. The signal processor of claim 12, the signal processing parameters comprising adaptively derived characteristics of the dispersive signal transmission path.

15. A dispersive channel modeling device for modeling a dispersive path in a multicarrier telecommunications system, the device having the signal processor of claim 12.

16. A computer readable medium encoded with at least one computer program that, when executed on a computer, carries out a method of equalizing for multi carrier transmission, for at least reducing delay dispersion in a signal, the method comprising: converting a multi carrier signal into sampled frequency domain signals, the converting being arranged to use a sequence of consecutive samples of the multicarrier signal for reduction of dispersion of at least one symbol, where the sequence has a length of at least two symbols; separating odd and even samples of the oversampled frequency domain signals before suppressing time domain delay dispersion on the sampled frequency domain signals; suppressing time domain delay dispersion on the sampled frequency domain signals using frequency-domain dispersion parameters to produce a suppressed dispersion frequency domain output signal; and updating the frequency-domain dispersion parameters based, at least in part, on feedback provided by a suppressed dispersion frequency domain output signal.

* * * * *

UNITED STATES PATENT AND TRADEMARK OFFICE
CERTIFICATE OF CORRECTION

PATENT NO. : 7,623,578 B2
APPLICATION NO. : 10/514690
DATED : November 24, 2009
INVENTOR(S) : Fabio Pisoni et al.

It is certified that error appears in the above-identified patent and that said Letters Patent is hereby corrected as shown below:

Col. 1, line 36, should read:
length data "blocks" or "symbols" each having the same num- Col. 8, line 11, should read:
cation.

Col. 17, line 55, equation (34) should read:

$$Y^F = \frac{1}{2}\left\{diag(\Lambda^f_{even}) + F_{N/2} \cdot P^D \cdot F_{N/2}^{-1} \cdot diag(\Lambda^f_{odd}) \cdot F_{N/2} \cdot P^{D^*} \cdot F_{N/2}^{-1}\right\} \cdot W^F \quad \text{eq.(34)}$$

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,623,578 B2  
APPLICATION NO. : 10/514690  
DATED : November 24, 2009  
INVENTOR(S) : Pisoni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Twenty-sixth Day of October, 2010

David J. Kappos  
*Director of the United States Patent and Trademark Office*